Jan. 30, 1934. D. C. KLAUSMEYER ET AL 1,945,047
HEAD MOUNTED ARM CLAMP AND ELEVATING CONTROL
Filed Dec. 5, 1929 6 Sheets-Sheet 4

Fig. 6.

Inventors
David C. Klausmeyer
Augustus M. Losa
By Attorneys
Nathan & Bowman

Jan. 30, 1934.  D. C. KLAUSMEYER ET AL  1,945,047
HEAD MOUNTED ARM CLAMP AND ELEVATING CONTROL
Filed Dec. 5, 1929   6 Sheets-Sheet 6

Inventors
David C. Klausmeyer
Augustus M. Sosa
By Attorneys
Nathan & Bowman.

Patented Jan. 30, 1934

1,945,047

UNITED STATES PATENT OFFICE 1,945,047

HEAD MOUNTED ARM CLAMP AND ELEVATING CONTROL

David C. Klausmeyer, Hyde Park, and Augustus M. Sosa, Cincinnati, Ohio, assignors to The Cincinnati Bickford Tool Company, Cincinnati, Ohio, a corporation of Ohio Application December 5, 1929. Serial No. 411,924

19 Claims. (Cl. 77—28)

This invention in certain broad aspects is concerned with improvements in mechanical systems for elevating or lowering radial drill arms and for clamping the arm in position after adjustment thereof to maintain a necessary rigidity during drilling operations.

The increased size of such machines and the increased forces to which they are subjected, combinedly resulting from the ponderous parts and enormous working stresses, coupled with the demands for speedier and more accurate production has presented new problems to builders of these types of machines, and has rendered many arrangements gradually developed by ingenious engineers unsatisfactory as applied to the newer conditions. Further, with the more complicated and costly machines safety devices for the prevention of accidents and breakage, as contemplated by the present organization, have become exceedingly desirable.

In the interests of convenience to the operator and increased production, arrangements have been devised in which a single lever is mounted on the drill head where it is within the ready reach of the operator and which lever was connected to both the clutch means for the power elevating means and to the mechanism for clamping the arm to the column. However, these specific systems have been limited in their scope of control in that additional means must be resorted to and manipulated, in many instances, in order that the arm might be caused to move in the particular vertical direction desired. The single lever thus provided served only to render the elevating means operative, whether the arm was raised or lowered thereby being dependent upon the particular direction in which the driving means was rotating. In many instances, therefore, it was necessary to correct this by resorting to other and additional controls. This would usually disturb the operation of some other mechanism driven from the same source which, after the arm adjustment had been made, must be restored again to the normal operation.

The present invention, in addition to supplying all the advantages of these prior arrangements, further eliminates the above briefly noted difficulties and troublesome details of operation and renders the elevating and clamping operations completely under the control of the single lever mounted on the drill head. A reversible clutch driving means is incorporated in the system which may be operated to either raise or lower the arm simply by a selective manipulation of the one lever.

The control connection between the hand lever mounted on the drill head and the clamping mechanism and elevating control mechanism is thus, in such an arrangement, required to serve many functions largely independent and without disturbing the particular mechanism desired not at the particular time to be made effective and the positions and movements of the control connection, such as the control shaft in the present construction, are, accordingly, many. To provide for all these functions from the single control lever presents difficult problems and particularly so where the situation is further complicated by the fact that the hand lever itself must be made bodily and independently movable in accordance with the necessity of adjusting the drill head upon which the lever is mounted along the arm.

The arrangement disclosed herein presents a very simple, accurate and easily operated means for the accomplishment of such objects. By the construction provided the control shaft extending along the arm may be either moved axially or rotated relative to the arm and these from any position of the head. The specific arrangement of this particular feature of the invention, which enables a control shaft to be selectively rotated or axially shifted from a single lever which itself is independently and bodily movable along the shaft, is such as to be capable of utilization to considerable advantage in situations other than the present general organization and constitutes one of the broader aspects of this invention.

A further feature of this invention involves the provision of a safety or interlocking device which prevents the clamping mechanism and elevating mechanism being thrown in or occupying their effective positions concurrently, with the attendant breakage of parts which would result therefrom. Such safety means broadly are known and have been provided in prior arrangements, but with the re-organization of the system to provide additional operative positions and new functions of the controlling mechanisms, new problems were necessarily encountered in endeavoring to provide a satisfactory safety feature.

Other objects of the invention relate to more specific features of certain portions of the construction and include a compact simple arrangement of operative connections between the manual lever and the control shaft whereby, through a minimum of effort and variations in movement of the former, the particular movement of the control shaft desired may be selectively imparted thereto. Alternative constructions for this function have been devised and are disclosed herein, each having certain advantages peculiar to that particular arrangement but both being well adapted to achieve the results sought.

Further objects are directed to the provision of a combined equalizer and compensating mechanism adapted to insure that both clamps are uniformly drawn into effective position irrespective of the different resistances encountered as is normally the case where the arm projects at some distance from the vertical column and the turning moment created therefrom results in the imposition of forces on the column and engaging arm portion of different direction and intensity. Equalizing and also compensating devices for this purpose have been heretofore provided but the present one is of far more simple design and is peculiarly adapted for cooperation with the more general aspects of the invention disclosed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
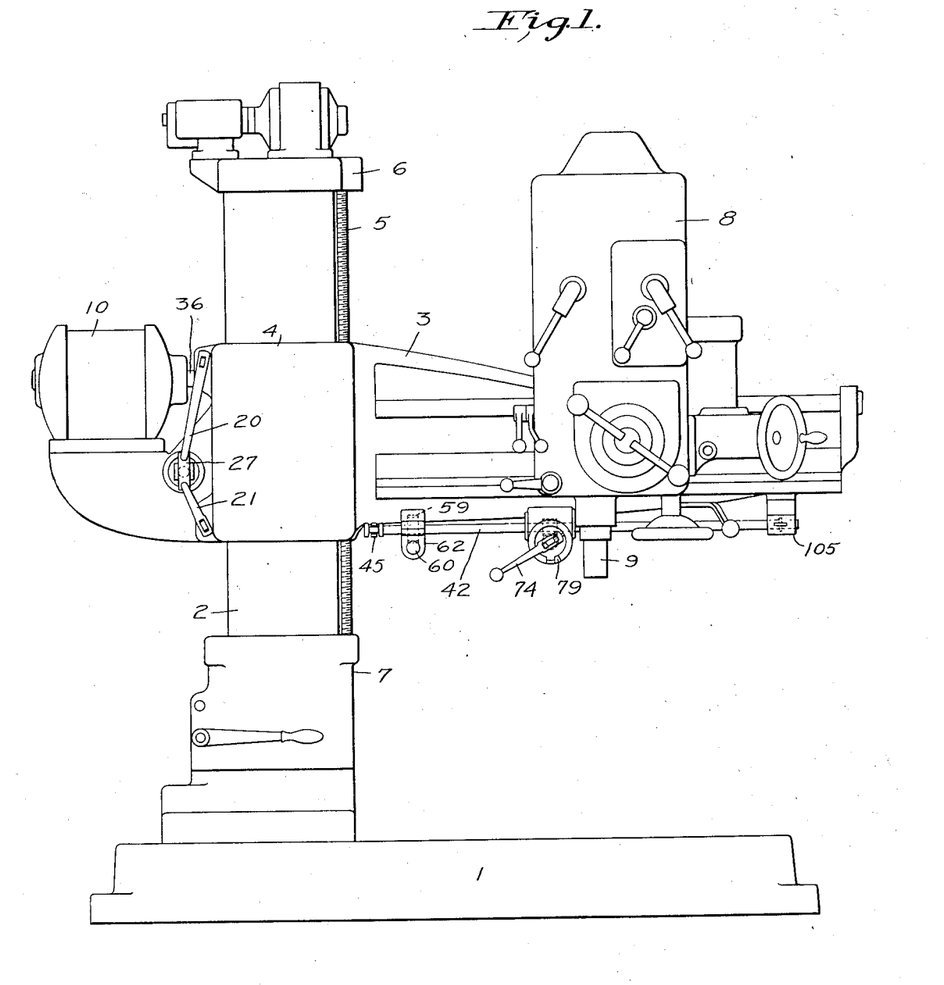
Figure 1 shows a somewhat conventional type of radial drilling machine with this invention incorporated therein.

Fig. 1 shows a somewhat conventional type of radial drilling machine of which the main elements are a base 1 supporting a cylindrical column on which the cylindrical sleeve 2 is rotatably mounted, the sleeve 2 carrying thereon the radial drill arm 3 having a slit ring portion 4 encompassing the cylindrical sleeve 2. The arm 3 is vertically supported by and adapted to be elevated by the rotary screw 5 having bearings in the upper cap portion 6 and the lower base portion 7 of the sleeve 2. The saddle 8 is mounted on the arm 3 for translation therealong in the usual manner. A drill spindle 9 is carried by the saddle or drill head 8 in the usual manner. At 10 is shown a motor for driving the drill spindle and related mechanism in accordance with any recognized arrangement.

The features thus far described are somewhat general and are merely typical of one type of machine in which the present invention may be advantageously employed.

Figures 4, 5:
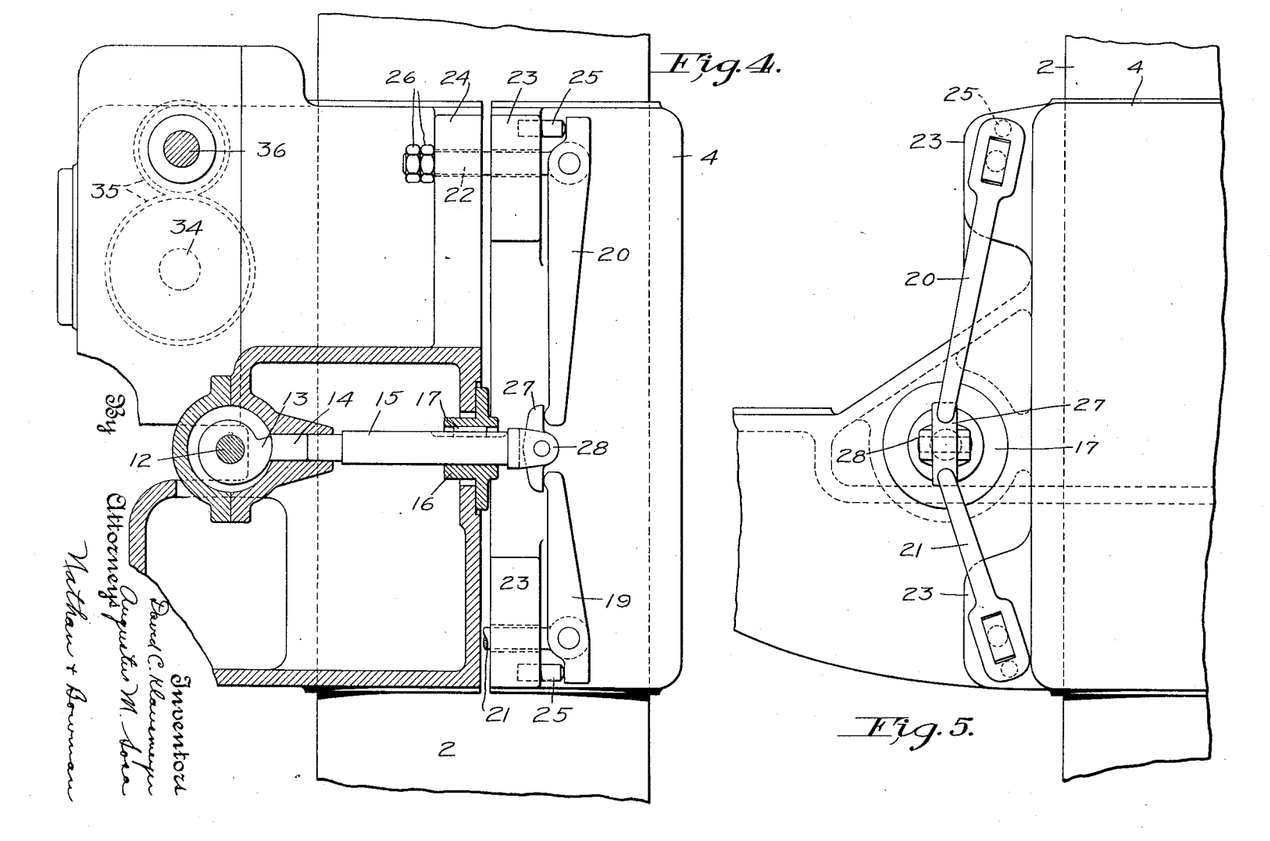
Fig. 4 is a cross sectional view of the arm showing elements of the clamping mechanism taken on the line 4—4 of Fig. 2.
Fig. 5 is a partial front view of the rear portion of a drill arm showing the clamping mechanism.

In Figs. 4 and 5 details of a clamping mechanism for rigidly securing the arm on the drill column sleeve are shown. The clamping mechanism is adapted to be operated through rotation of a shaft 12 operated from a source to be later described in detail. The shaft 12 carries a cam 13 operable against a pin 14 which bears longitudinally against a plunger 15 longitudinally slidable in a bushing 16 mounted in an opening of the drill arm. A key 17 or other suitable device is provided for prevention of rotation of the plunger 15. The immediate arm clamping mechanism consists of two opposed levers 19 and 20 pivoted on eye-bolts 21 and 22 respectively and projecting through openings in the flanged portions 23 and 24 of the slit ring portion of the drill arm. Fulcrums are provided for each of the clamping levers 19 and 20 consisting of pins 25 embedded in the flange 23. Clamp adjusting and locking nuts 26 are provided on the bolts 21 and 22. An equalizer bar 27 is pivoted within the outer forked portion 28 of the plunger 15, the opposite ends of which equalizer bear against the inner ends of the opposed clamping levers 19 and 20.

The arrangement just described provides a very positive and accurate means for clamping a mechanism, such as a drill arm, in position and is particularly effective in a situation such as the present one, where a long drill arm is suspended horizontally from the column and exerts an enormous turning moment on the column due to the combined weight of the projecting portion of the arm and the drill head supported thereon, in addition to any other stresses which may frequently be imposed on the arm. It will be seen that there will be a turning moment set up by the arm in a clockwise direction in Fig. 1 and that such will tend to spread the opposed flanged portions 23 and 24 of the sleeve at the upper end thereof in Fig. 4 e. g., whereas at the lower end the pressure will be exerted at the inner or saddle side of the sleeve. A greater force, therefore, would be required to bring the upper portion of the arm sleeve together and into close engagement with the column sleeve. The present invention provides for this condition in a very simple manner by making the lever arm 20 of greater length than 19. This arrangement, in conjunction with the equalizer bar 27, enables the sleeve to be clamped in a very uniform manner.

Figure 2:
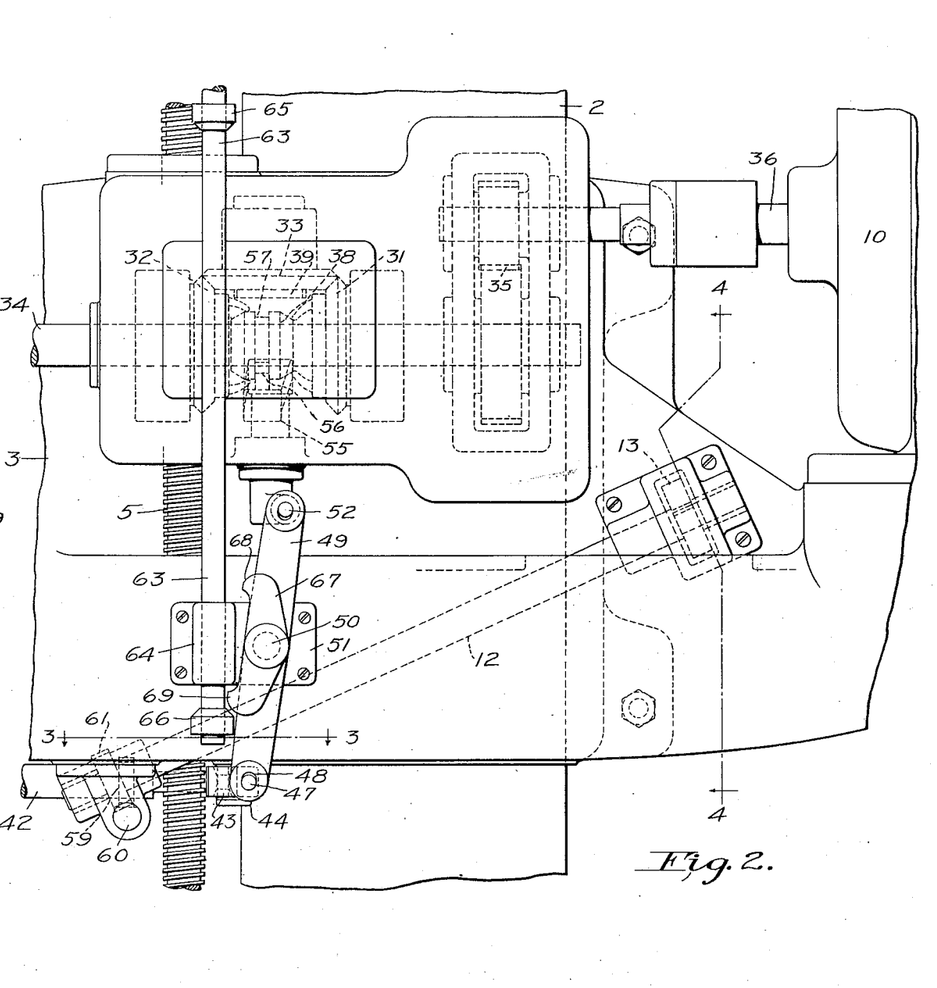
Fig. 2 is a fragmentary view of what is termed the back of the machine with the parts shown on an enlarged scale.
Figure 3:
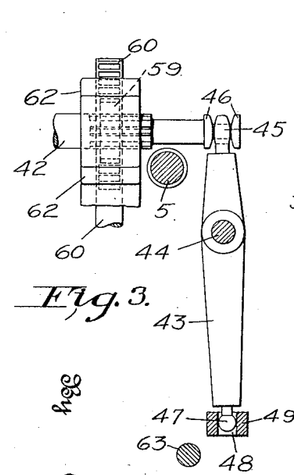
Fig. 3 is a fragmentary view showing the relation of certain parts taken on approximately the line 3—3 of Fig. 2.
Figure 6:
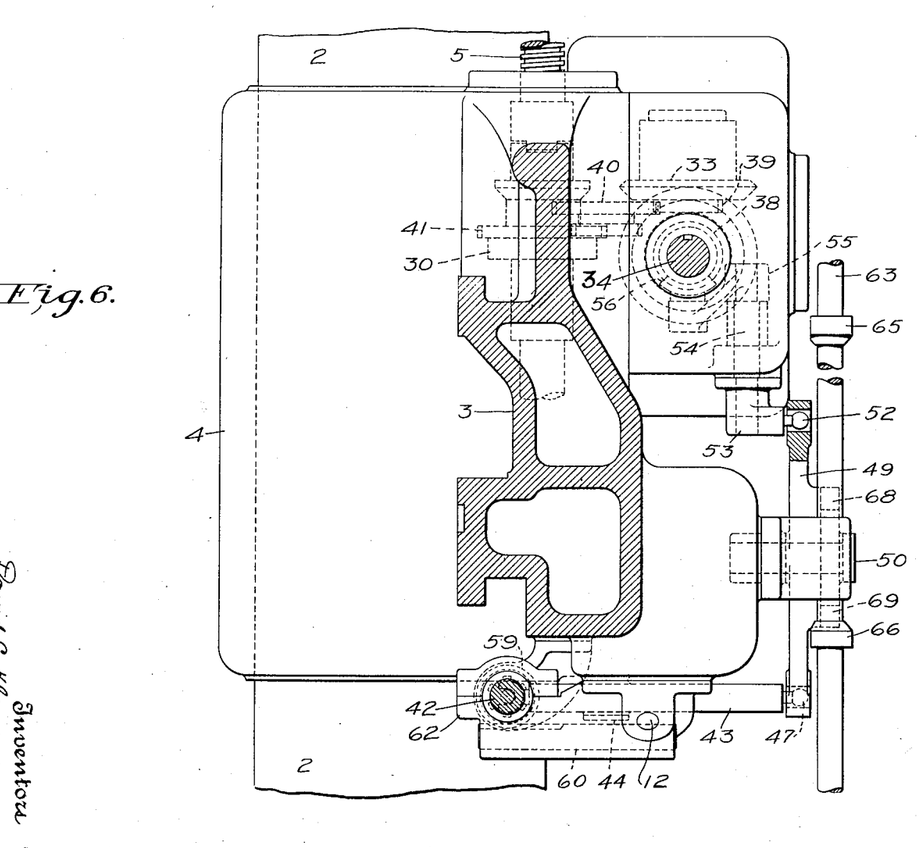
Fig. 6 is a cross sectional view of the arm looking from the left in Fig. 2.

A detailed description of the elevating mechanism and the immediate control parts will now be given. In accordance with common practice the present arrangement includes the heretofore mentioned screw shaft 5 with which a nut 30 is adapted to cooperate, such nut being supported in bearings in the drill arm and derives its rotation from a reversible clutch mechanism shown best in Fig. 2, including opposed bevel gears 31 and 32, both meshing with bevel gear 33. The bevel gears 31 and 32 are normally free to rotate on the arm shaft 34 extending longitudinally of the arm and which, in the present form of construction, forms the main drive shaft for the drill head mechanism. The shaft 34 is driven through suitable gearing 35 from the motor shaft 36. Each of the bevel gears 31 and 32 are provided with clutch means selectively operable through the spool 38, whereby either bevel gear may be secured to rotate with the shaft 34 and the bevel gear 33 correspondingly rotated. The drive to the nut 30 is shown in dotted lines in Fig. 6 and includes a gear 39 integral with the bevel gear 33, which drives the double gear 40, meshing at its lower part with the spur gear 41, integral with the nut 30. The mechanism just described is merely one form of a reversible drive mechanism for the elevating mechanism, it being clear that other specific types may be employed and that the screw 5 may be rotated and the nut 30 held fixed, if desired, in accordance with well known types of constructions.

The elevating clutch mechanism is controlled from a shaft 42 extending longitudinally of the arm, said shaft being both rotatable and axially movable to a limited extent in its support on the arm. The axial movement of the shaft 42 serves, through a series of linkages, to actuate the elevating clutch mechanism, such linkage including a lever 43, pivoted intermediate its ends on a pin 44, secured in the lower portions of the drill arm. One end of the lever 43 has a forked portion 45, projecting around the shaft 42, between opposed bearing portions 46. The opposite end of the lever 43 is provided with a ball 47, engaging in an opening 48 of the second lever 49, pivoted at 50 upon a bracket 51, supported on the back of the drill arm. The upper end of the lever 49 is also provided with an opening which receives a ball 52. The ball 52 is carried by an arm 53 rigidly secured on a shaft 54, mounted in suitable bearings in the drill arm. The opposite end of the shaft 54 carries rigidly thereon an arm 55, provided with a shoe 56, operative in the groove 57 of the spool 38, to shift the latter longitudinally and engage either one of the clutch mechanisms associated with the bevel gears 31 and 32.

Rotation of the shaft 42 serves to operate the clamping mechanism through the shaft 12 previously described, the connecting mechanism consisting of a gear 59, splined on the shaft 42, engaging with a shiftable bar 60, slidably mounted in brackets on the lower side of the arm. The opposite end of the bar 60 is provided with rack teeth, meshing with the gear 61, fixed on the shaft 12. A bracket 62 supports the inner end of the shaft 42 and the forward end of the rack bar 60, the splined connection between the shaft 42 and the gear 59 permitting the shaft 42 to be moved axially relative to the bracket and gear.

The control and operating mechanisms thus far described are manually operative, the shaft 42 being connected to a hand lever and associated mechanism mounted on the drill head, to be hereinafter described. An automatic control for the elevating mechanism is provided to prevent overrunning of the arm in either direction during a raising or lowering movement, such means consisting of a rod 63 fixed to the column sleeve 2, the arm being vertically movable with respect thereto with the rod, however, firmly guided through an opening in the boss 64 of the bracket 51. The rod 63 has adjustably secured thereon cams 65 and 66 which are adapted to be engaged by a rocker 67 rigid with or secured to the lever 49, and having opposite cam ends 68 and 69 adapted to engage the cams 65 and 66 respectively.

Mechanism, whereby both the reversible clutch elevating mechanism and the clamping mechanism may be operated from a single lever on the drill head, is provided. Two specific forms of construction for accomplishing such functions are illustrated. The form shown in Figs. 7, 8 and 9 will be first described, such including a transverse shaft 71 mounted at the lower extremity of the saddle in supporting housings 72 and 73, carried by the lower end of the drill head 8. A hand operative lever 74 is pivoted at 75 to the outer end of the shaft 71. A device is provided which determines the path and limits of movement of the hand lever 74 which are made capatible with the movements to be imparted to the shaft 42. The shaft 71 may occupy either one of two axial positions, and be rotated by the lever 74 in either of these axial positions. The device referred to includes a head 76 secured to the outer end of the housing 72 provided with an inner annular groove 77 in which tracks a ball 78 secured to the end of the hand lever 74. When the hand lever occupies its outer position it may be rotated through substantially a complete circumference limited only by the lug 79 integral with the head 76. Movement of the lever 74 in this outer path serves to operate the clamping mechanism, as will be later described, the angle of rotation being amply large to permit of this function through gearing and mechanical connections of such ratio that the force required is not large and well within the ability of any operator. An opening 80 is provided in the head 76 permitting the lever to be pushed inwardly to be operated through a limited circumferential opening 81 at the ends of which are shown in dotted lines in Fig. 9. When the lever 74 is in an angular position to pass through the opening 80 the clamping mechanism and the elevating mechanism will be in their ineffective positions, i. e. the arm will be unclamped and the elevating clutch mechanism will be in neutral position. The specific connection between the shaft 71 and the control or operating shaft 42 illustrated in Figs. 7 and 8 will now be described and consists of the carrier 83, slidably mounted within the casing 73, but restrained from rotation therein by means of the key 84. This carrier has supported therein the sleeve 85, splined as indicated at 86, on the shaft 42, and having integral with the sleeve 85 or secured thereon a helical gear 87. The sleeve 85 may be journaled in the carrier 83 through the medium, if desired, of ball bearings 88. The shaft 71 is splined in a sleeve 89 supported in suitable bearings 90 in the housing 73. The sleeve 89 carries or has integral therewith a helical gear 91. Secured upon the shaft 71 between the opposed bearing washers 92 is an arm 93, carrying at its outer end a plunger sleeve 94 slidably operative in an opening in the casing 73. In the same opening is mounted a bushing 96 slidable therein, having a projecting portion 97 slidable within the barrel of the sleeve 94 but normally urged outwardly therefrom by means of the spring 98. A bolt 99 extends centrally through these elements and carries at the inner end a locking plunger 100 which in vertical cross section may be rectangular in shape to prevent rotation thereof. The locking plunger 100 is connected to the bolt 99 by means of a T-slot arrangement which permits a limited amount of relative axial movement between the bolt 99 and the locking plunger 100, and also permits the plunger 100, when in an inner position, to be slid horizontally relative thereto in a direction parallel to the shaft 42. The inner end of the locking plunger 100 is provided with rack teeth 101, engageable with teeth of the rack 102, cut integral with and extending substantially for the entire length of the rod 42. The spring 98, it will be seen, permits of a delayed engagement between the teeth of the plunger 100 and the rack 102 in the event that they are not in a position for accurate meshing upon inward movement of the shaft 71 and likewise the sleeve 94.

Figures 7, 8, 13:
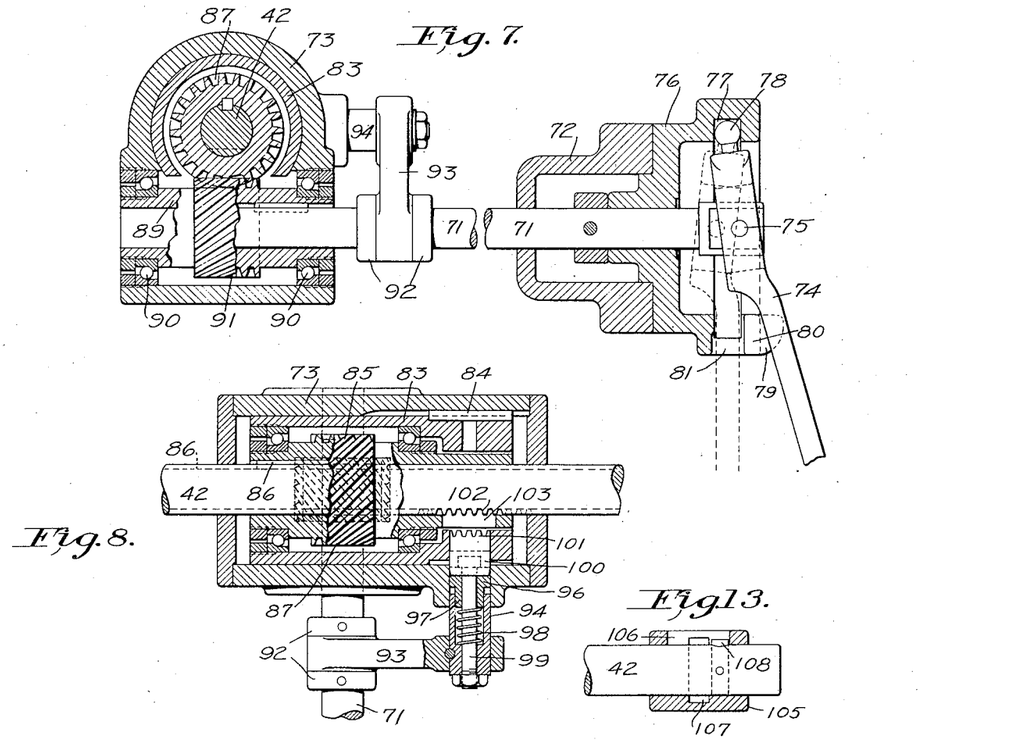
Fig. 7 is a fragmentary view in cross section showing details of one form of manual control mechanism for the clamping and elevating mechanisms.
Fig. 8 is a horizontal cross sectional view therethrough.
Fig. 13 is a cross sectional view taken through the center line of Fig. 12.

The operation of the mechanism just described will now be stated. In the position of the elements, as shown in Figs. 7 and 8, the locking plunger 100 occupies a position which prevents longitudinal movement of the carrier 83 and likewise of the sleeve 85 and the gear 87 carried thereby. Accordingly, therefore, rotation of the shaft 71 and the gear 91 therewith causes rotation of the control shaft 42, and thereby through the mechanism previously described, operation of the clamping mechanism. Upon return of the clamping lever to the neutral position the clamping mechanism is operated to the release position and the lever in this neutral position may be forced inwardly to the dotted line position shown in Fig. 7. With the inward movement of the shaft 71 the locking plunger 100 is forced inwardly through the opening 103 of the sleeve 85, and since the key 84 prevents rotation of the carrier 83, rotation of the sleeve 85 and gear 87 will likewise be restrained, and therefore, upon rotation of the shaft 71 in its inner position axial movement of the gear 85 will occur in either direction, dependent upon the direction of angular movement of the shaft 71. Since at this time teeth 101 of the plunger 100 are in engagement with rack teeth 102, the shaft 42 necessarily partakes of any axial movement of the gear 85. As previously described, the elevating clutch mechanism will be operated to forward or reverse position, and the arm raised or lowered in accordance therewith.

Figure 12:
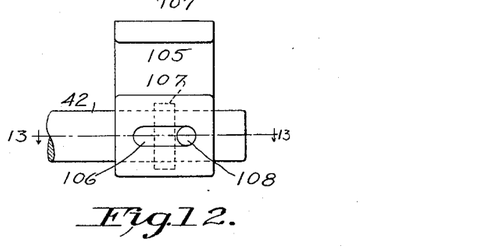
Fig. 12 is a fragmentary view of an interlocking means shown at the extreme right of the arm in Fig. 1.

The housing 76, it will be observed, provides and enforces the movement of the lever 74 in accordance with predetermined paths and prevents lever 74 being operated to render the clamping and elevating mechanisms concurrently operative. However, an additional safety or interlocking means positively acting on the shaft 42 is provided as shown in Figs. 12 and 13 cooperating with the outer end of the shaft 42. The bracket 105, supporting the outer end of shaft 42, has within the bearing a longitudinally extending slot opening 106 and within the bearing an inner annular groove 107. A pin 108, secured in the shaft 42, is confined to movement within these two openings 106 and 107 and, accordingly, restricts the shaft 42 to a predetermined path and positively prevents both the clamping mechanism and either of the elevating clutches being operative at the same time.

Figure 9:
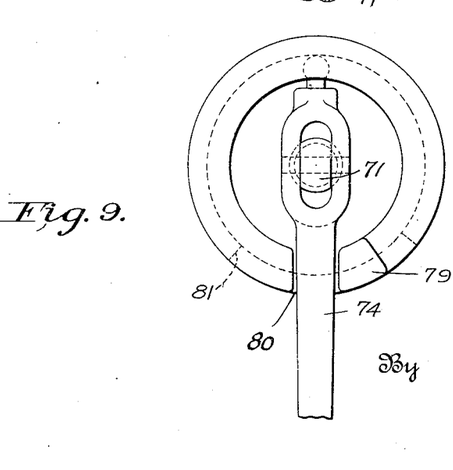
Fig. 9 is a view of the manually operable lever and looking from the right in Fig. 7.
Figure 10:
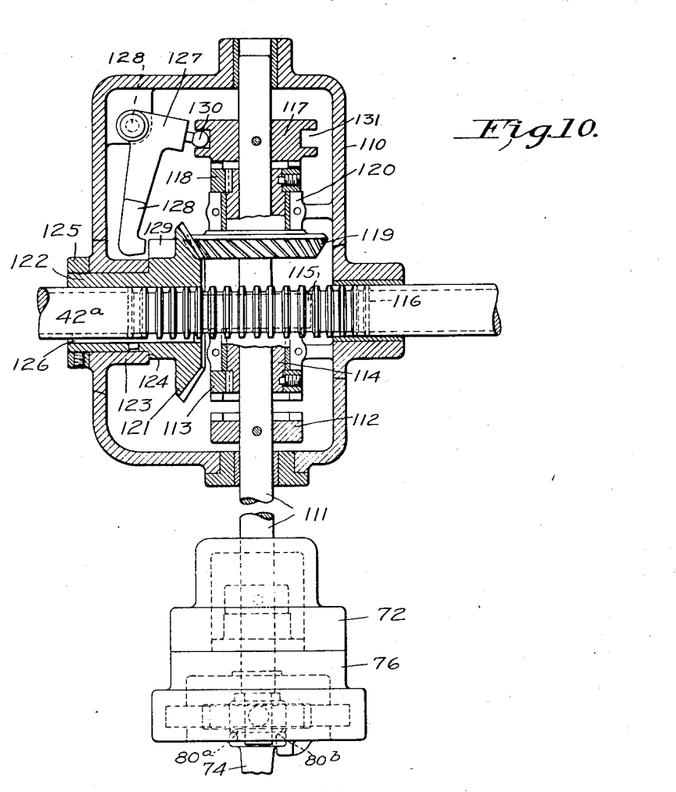
Fig. 10 is a horizontal sectional view of an alternative construction of manual control mechanism.
Figure 11:
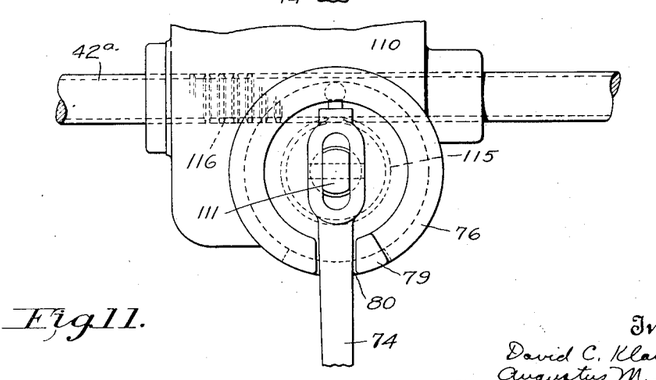
Fig. 11 is a front view in elevation of the device shown in Fig. 10.

A form of construction for actuating the control shaft 42a from the manual lever 74 is shown in Figs. 10 and 11 which functions in a manner similar to that of Figs. 7, 8 and 9 but differs therefrom in specific details.

In the construction of Figs. 10 and 11 a housing 110 secured to the lower part of the drill head supports one end of the shaft 111 corresponding to shaft 71 of Fig. 7. The outer end of shaft 111 projects through a housing 72 and head 76 exactly like that in Fig. 7. Within the housing 110 a clutch member 112 has teeth adapted to engage with teeth on the opposed clutch member 113 which is keyed and secured to the sleeve 114 rotatably mounted in a supporting bearing in the housing 110 and likewise being free to rotate on the shaft 111 in the position thereof, as shown in Fig. 10. The sleeve 114 has secured on the inner end a gear 115 meshing with circular rack 116 on the control shaft 42a. The mechanism just described constitutes a means for shifting the control shaft axially and thereby controlling the arm elevating mechanism, the connections thereto from the shaft 42a being the same as heretofore described in connection with shaft 42.

The extreme inner end of shaft 111 carries a spool 117 which has clutch teeth adapted to engage with co-acting clutch teeth on the member 118 secured to the hub of the bevel gear 119, freely mounted on the shaft 111 and rotatably supported in a bearing 120 formed in a transverse web of the housing 110. The bevel gear 119 meshes with the bevel gear 121, the latter having a hub portion 122 rotatably mounted in the bearing 123 of the housing 110. Endwise movement of the gear 121 and hub 122 is prevented by the opposed shoulder 124 and the collar 125 secured on the outer end of hub 122. The gear 121 is splined through the medium of the key 126 to the shaft 42a whereby rotation of the gear 121 causes rotation of the shaft 42a but the housing 110 and enclosed mechanism is freely translatable with the drill head along the control shaft 42a. Inasmuch as the axes of the bevel gears 119 and 121 do not intersect the teeth are preferably helical in form, such specific form of helical gearing being frequently termed hypoid gearing.

An interlock is provided to prevent rotation of the gear 121 and shaft 42a when the latter is being shifted axially through rotation of gear 115. This interlock consists of a member 127 pivoted at 128 in the housing 110 having a finger 128 adapted to engage in the notch 129 formed in the hub 122; and a second finger angularly displaced from the first carrying a ball 130 tracking in the groove 131 of the spool 117. When the shaft 111 is moved inwardly, to cause clutch members 112 and 113 to enterengage for axial shifting of the control shaft 42a, the finger 128 engages in the slot 129 to prevent rotation of gear 121 which latter engagement of the finger 128 initially occurs before spool 117 is disengaged from clutch 118. The positive interlocking means of Figs. 12 and 13 are also employed with this construction and the relation of all the elements is such that the notch 129 is always opposite the finger 128 when the lever 74 is in neutral position and free to be moved in or out through the opening 80. It will be noted that the sides of the opening 80 are flared or bell mouthed inwardly at 80a and 80b to permit a slight jockeying of the lever prior to its full movement into the inner track and thereby compensate for any slight distance that the opposed teeth may be displaced from meshing position.

It will be seen that either of the above described arrangements provide a very simple and compact construction which enables the lever 74 to perform any one of several functions in any position of the drill head 8, and in addition to operating a clamping mechanism and a clutch mechanism, it may be selectively employed to operate either one of two clutches and thereby to control a reversible drive for elevating or lowering the arm, as desired, without resorting to auxiliary means or other levers to reverse the driving mechanism. The arm shaft 34, it may be seen, therefore, may be normally rotated in but a single direction in accordance with the requirements of the drill spindle and the arm lowered or raised at any time without interference with the rotation of the drill spindle and the related gearing associated with the drill spindle within the drill head.

The achievement of this additional function and advantage is made possible by the unique arrangements disclosed herein for imparting to the shaft 42 or 42a rotation in either direction, or axial movement thereto in either direction, such movements being obtained from a single lever which itself is mounted on the head and translatable relative to this control shaft.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of United States:—

1. A drilling machine combining a supporting column; an arm translatably mounted thereon; a drill head translatably mounted on said arm; a reversing clutch driving means for translating said arm in either direction on said column; means for clamping said arm in adjusted position; a single manually operable lever mounted on said head and having two independent paths of movement; connections operated by said lever in one of said paths for selectively operating said reversing clutch means to cause translation in either direction; and connections operable from said lever during its movement in the other path for operating said clamping means.

2. A drilling machine combining a support; an arm translatably mounted thereon; a drill head translatably mounted on said arm; a manually operable lever mounted on said head and having two independent paths of movement; a reversible drive means for translating said arm in either direction; means for clamping said arm in adjusted position; connections operable from said lever in one of said paths to said reversible drive means to selectively cause thereby translation of said arm in either direction; and connections operable from said lever during its movement in the other path for operating said clamping means.

3. A drilling machine combining a supporting column; an arm translatably mounted thereon; a drill head translatably mounted on said arm; a reversible mechanism for translating said arm in either direction on said column; means for clamping said arm to said column in adjusted position; a manually operable element mounted on said drill head; connections therefrom to said reversible mechanism to selectively operate the latter to translate said arm in either direction; connections from said element to operate said clamping means said latter connections being independent of the first mentioned connections whereby said reversible mechanism may be moved from one position to the other without affecting said clamping means, said first and second named connections being alternately operable whereby either mechanism may be fully controlled independently of the other; and an interlocking means to prevent the clamping means and translating means being made effective concurrently.

4. A radial drilling machine combining a supporting column; an arm translatably mounted thereon; a drill head translatably mounted on said arm; reversible driving mechanism for translating said arm in either direction; mechanism for clamping said arm to said column; a shaft extending longitudinally of said arm and mounted for limited rotary and translatory motion relative to said arm; manually operable means mounted on said head adapted to be connected to said shaft in either of two ways selectively to impart said motions thereto; and operative connections from said shaft to each of said mechanisms whereby one may be operated by the longitudinal movement of said shaft and the other by the rotary motion thereof.

5. A radial drilling machine combining a supporting column, an arm translatably mounted thereon; a drill head translatably mounted on said arm; reversible driving mechanism for lowering or raising said arm; clamping mechanism for securing said arm in adjusted position; a shaft extending longitudinally of said arm and mounted for both rotary and translatory motion; means operative from said head for translating said shaft longitudinally of said arm; means operative from said head for rotating said shaft; a single lever alternately connected to said means; and operative connections from said shaft to each of said mechanisms whereby said reversible driving mechanism may be operated by one of said motions to selectively raise or lower said arm, and by the other of said motions to clamp the arm in adjusted position.

6. A radial drilling machine combining a support; an arm translatably mounted thereon; a drill head translatably mounted on said arm; means for translating said arm in either direction; control mechanism therefor; mechanism for clamping said arm in adjusted position; a shaft extending longitudinally of said arm and mounted for rotary or translatory motion thereon; means for translating said shaft; means for rotating said shaft; a single lever mounted on said head for alternately actuating said means; connections from said shaft to said mechanisms for operating each by one of said motions; and means controlling the movement of said lever for preventing both of said mechanisms being made effective concurrently.

7. A radial drilling machine combining a supporting column; an arm translatably mounted thereon; a drill head translatably mounted on said arm; a plunger mounted in said arm adjacent said column; an equalizer carried by an outer end of said plunger; opposed pivoted clamp operating levers engaging with said equalizer; a shaft extending longitudinally of said arm; a cam for operating said plunger; means for operating said cam from said shaft; and manually operable means mounted on and movable with said drill head for operating said shaft and thereby the clamping levers.

8. A drilling machine combining a support; an arm translatably mounted thereon; a drill head translatably mounted on said arm; power driven reversible clutch means; means adapted to be driven thereby for translating said arm in either direction; a shaft extending longitudinally of said arm; manually operable means mounted on and movable with said head having connecting means for longitudinally shifting said shaft in any position of said head; and a rotatable lever carried by said head and geared to said shaft and said reversible clutch means whereby the translation of said arm in either direction may be controlled from said head.

9. A machine tool combining a support; an arm translatably mounted thereon; a tool head translatably mounted on said arm; means for translating said arm; control mechanism therefor; clamping mechanism for said arm; a control shaft mounted for rotary and axial movement; operative connections therefrom to each of said mechanisms; a control lever mounted on said head, said lever being movable in two paths; means for axially moving said shaft by movement of said lever in one path to operate one of said mechanisms; and means for rotating said shaft by movement of said lever in its other path to operate the other of said mechanisms.

10. A machine tool combining a clamping mechanism; a control mechanism; an operating shaft mounted for rotary and longitudinal motion; means for operating said clamping mechanism from one of said motions; means for operating said control mechanism from the other of said motions; and means for selectively imparting either of said motions to said operating shaft comprising an axially movable actuating shaft arranged transversely thereto; means operative by rotation of said actuating shaft when in one axial position for longitudinally moving said operating shaft; and means operative by rotation of said actuating shaft when in another axial position for rotating said operating shaft.

11. A machine tool having a control shaft therefor adapted to operate different mechanisms by axial and rotary motion of said control shaft combining an axially movable and rotary actuating shaft; means for rotating said control shaft by rotation of said actuating shaft when the latter is in one axial position; means for longitudinally moving said control shaft by rotation of said actuating shaft when the latter is in a different position; and an interlock to prevent the movement of said control shaft to render both of said mechanisms concurrently effective.

12. A machine tool combining a supporting member; a control shaft extending along said member and axially and rotatably movable with respect thereto; one mechanism adapted to be actuated by the rotary movement of said shaft and another mechanism adapted to be actuated by the axial movement thereof a tool head mounted on said member and translatable therealong adjacent to and relative to said shaft; a manually operable lever mounted on and translatable with said head; and means operated by movements of the lever for selectively connecting said lever either to rotate or to shift axially said control shaft.

13. A machine tool combining a supporting member; a control shaft extending along said member mounted for axial and rotatable movement with respect thereto; control mechanism connected to be actuated thereby a head translatable along said member adjacent said shaft; a manually rotatable element mounted on and movable with said head; a helical gear connection between said element and shaft normally slidable with respect to said shaft to permit translation of said head independent of said shaft; means to selectively prevent rotation of said shaft; whereby rotation of said element causes translation of said shaft and means to selectively prevent translation of said shaft whereby rotation of said element causes rotation of said shaft.

14. A machine tool combining control mechanism; a control shaft; connections for operating said mechanism by the rotary movement of said control shaft and by the axial movement thereof; an actuating shaft mounted for rotary and axial movement; a first gear connected to rotate with said control shaft but translatable with respect thereto; a second gear connected to rotate with said first gear; clutch means engageable by axial movement of said actuating shaft in one direction for selectively rotating said second gear and thereby said control shaft by rotation of said actuating shaft; a rack carried by said control shaft; a rack gear meshing therewith; and clutch means engageable by axial movement of said actuating shaft in a direction opposite to said first-named direction for selectively rotating said rack gear by rotation of said actuating shaft and thereby to shift said control shaft axially.

15. A machine tool combining control mechanism; an axially movable control shaft connected to operate said mechanism; and selectively operable means normally translatable along said control shaft for axially moving said control shaft comprising an actuating shaft, a first helical gear connected to be rotated thereby, a second helical gear splined on said control shaft but normally translatable relative thereto, and means operable by axial movement of said actuating shaft to selectively lock said second gear against axial movement relative to said control shaft whereby rotation of said actuating shaft and first gear causes translation of said control shaft.

16. A machine tool combining control mechanism; a control shaft mounted for rotary and axial movements; connections for differently operating said mechanism dependent on the movement of said control shaft; means for rotating said shaft; and means normally translatable relative to said control shaft in the direction of its axis for selectively moving said control shaft axially comprising an actuating shaft, a first helical gear connected to be rotated thereby, a second helical gear splined on said control shaft, and means operable by axial movement of said actuating shaft to lock said control shaft and said second gear against rotation and to lock said second gear against axial movement relative to said control shaft whereby rotation of said actuating shaft and first gear causes axial movement of said control shaft.

17. A machine tool combining a movable supporting member and means for moving said member, a clamping mechanism for securing said support in position; a control mechanism for said means; a head movable on said machine tool; a control shaft extending along the path of movement of said head and mounted for rotary and longitudinal motion; means for operating said clamping mechanism from one of said motions; means for operating said control mechanism from the other of said motions; a control lever mounted on and movable with said head and rotatable in two paths; and means including an actuating shaft adapted to be rotated and shifted axially by said lever for selectively imparting one of said motions to said shaft from said control lever by its movements in each of said paths.

18. A machine tool combining a clamping mechanism; a control mechanism; a head movable on said machine tool; a control shaft extending along the path of movement of said head and mounted for rotary and longitudinal motion; means for operating said clamping mechanism from one of said motions; means for operating said control mechanism from the other of said motions; a rotatable actuating shaft carried by said head and adapted to be connected to said control shaft selectively to give to the latter its two movements; a control lever pivoted on said actuating shaft and movable therewith, said lever being movable in two paths; guide means to determine the paths of movement of said lever comprising a member carried by said head and provided with an annular groove adapted to receive a fulcrum stud on said lever thereby to provide a floating fulcrum for said lever, said member also being provided with a circumferential slot in the plane of said groove to permit rotary movement of said lever in one of said paths and a transverse slot to permit said lever to be moved out of said circumferential slot for rotary movement in its other path; means for axially moving said control shaft by movement of said lever in one path to operate one of said mechanisms; and means for rotating said control shaft by movement of said lever in its other path to operate the other of said mechanisms.

19. A radial drill combining a support; a radial arm translatably mounted thereon; a tool head translatably mounted on said arm; means for translating said arm; control mechanism therefor; clamping mechanism for said arm; a control shaft extending along said arm and mounted for rotary and axial movement; operative connections therefrom to each of said mechanisms; a rotatable and axially movable actuating shaft mounted in said tool head transverse to said control shaft; a control lever pivoted to said actuating shaft and having a floating fulcrum on said tool head, whereby the lever may be moved in one path to shift said actuating shaft axially to either of two positions and rotated in either of two other paths to effect rotation of said actuating shaft; means actuated by the rotation of said actuating shaft in one of its axial positions to rotate said control shaft thereby to operate one of said mechanisms; and means actuated by the rotation of said actuating shaft in its other axial position to shift said control shaft axially thereby to operate the other of said mechanisms.

DAVID C. KLAUSMEYER.
AUGUSTUS M. SOSA.